(12) United States Patent
Johnston et al.

(10) Patent No.: US 8,509,439 B2
(45) Date of Patent: Aug. 13, 2013

(54) ASSIGNING NONCES FOR SECURITY KEYS

(75) Inventors: David Johnston, Beaverton, OR (US); Duncan Kitchin, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1110 days.

(21) Appl. No.: 12/006,265

(22) Filed: Dec. 31, 2007

(65) Prior Publication Data

US 2009/0172394 A1 Jul. 2, 2009

(51) Int. Cl.
*H04L 29/06* (2006.01)

(52) U.S. Cl.
USPC .......................................................... 380/262

(58) Field of Classification Search
None
See application file for complete search history.

(56) References Cited

U.S. PATENT DOCUMENTS

| | | | | |
|---|---|---|---|---|
| 5,239,584 | A * | 8/1993 | Hershey et al. ................. | 380/28 |
| 6,829,357 | B1 * | 12/2004 | Alrabady et al. ............. | 380/262 |
| 7,472,285 | B2 * | 12/2008 | Graunke et al. ............. | 713/193 |
| 7,564,825 | B2 * | 7/2009 | Olivereau et al. ............. | 370/338 |
| 7,793,098 | B2 * | 9/2010 | Perkins et al. ................ | 713/160 |
| 2002/0101989 | A1 * | 8/2002 | Markandey et al. .......... | 380/210 |
| 2004/0156374 | A1 * | 8/2004 | Lee et al. ...................... | 370/401 |
| 2004/0161105 | A1 * | 8/2004 | Park et al. ........................ | 380/28 |
| 2004/0236937 | A1 * | 11/2004 | Perkins et al. ................ | 713/150 |
| 2004/0236964 | A1 * | 11/2004 | Haverinen ..................... | 713/201 |
| 2005/0021986 | A1 * | 1/2005 | Graunke et al. .............. | 713/193 |
| 2006/0008079 | A1 * | 1/2006 | Daemen et al. ................. | 380/28 |
| 2006/0008084 | A1 * | 1/2006 | Daemen et al. ................. | 380/29 |
| 2006/0047976 | A1 * | 3/2006 | Moroney et al. .............. | 713/193 |
| 2006/0120315 | A1 * | 6/2006 | Olivereau et al. ............. | 370/313 |
| 2007/0091359 | A1 * | 4/2007 | Suzuki et al. ................ | 358/1.15 |
| 2007/0160198 | A1 * | 7/2007 | Orsini et al. .................... | 380/28 |
| 2008/0044012 | A1 * | 2/2008 | Ekberg et al. ................... | 380/30 |
| 2008/0044025 | A1 * | 2/2008 | Corndorf ....................... | 380/270 |
| 2008/0101414 | A1 * | 5/2008 | Zhang ........................... | 370/476 |
| 2008/0192726 | A1 * | 8/2008 | Mahesh et al. ................ | 370/349 |
| 2008/0263647 | A1 * | 10/2008 | Barnett et al. ..................... | 726/6 |
| 2009/0265453 | A1 * | 10/2009 | Hirano et al. ................. | 709/223 |

OTHER PUBLICATIONS

David Johnston, U.S. Appl. No. 11/864,123, filed Sep. 28, 2007, entitled "Techniques for Communicating Information Over Management Channels ".

* cited by examiner

*Primary Examiner* — Oscar Louie
(74) *Attorney, Agent, or Firm* — Trop, Pruner & Hu, P.C.

(57) ABSTRACT

Secure communications may be implemented by transmitting packet data units with information sufficient to enable a receiving entity to reconstruct a nonce. That is, rather than transmitting all of the bits making up the nonce, some of the bits may be transmitted together with an identifier that enables the rest of the bits of the nonce to be obtained by the receiving entity.

14 Claims, 6 Drawing Sheets

ASSIGNING NONCES FOR SECURITY KEYS

BACKGROUND

This relates to communications systems and, particularly, to the assignment of nonces.

A communications system typically communicates sensitive information that is confidential and should be protected while in communication or at the endpoints. A wireless communications system may be particularly vulnerable since an unauthorized party may simply monitor a wireless communication medium, such as portions of the radio-frequency (RF) spectrum, to gather such sensitive information. As a result, wireless communications systems typically implement various security techniques to protect sensitive information from unauthorized access, particularly while in transit.

A communications security system may use a key for security. A key is a numeric code combined with text to encrypt the text for security purposes. Each time a message is encrypted using the key, a new value for a nonce is used to initialize the encryption. A "nonce" is a number value in a security system that is only used once during the lifetime of a key.

DETAILED DESCRIPTION

Figure 1:
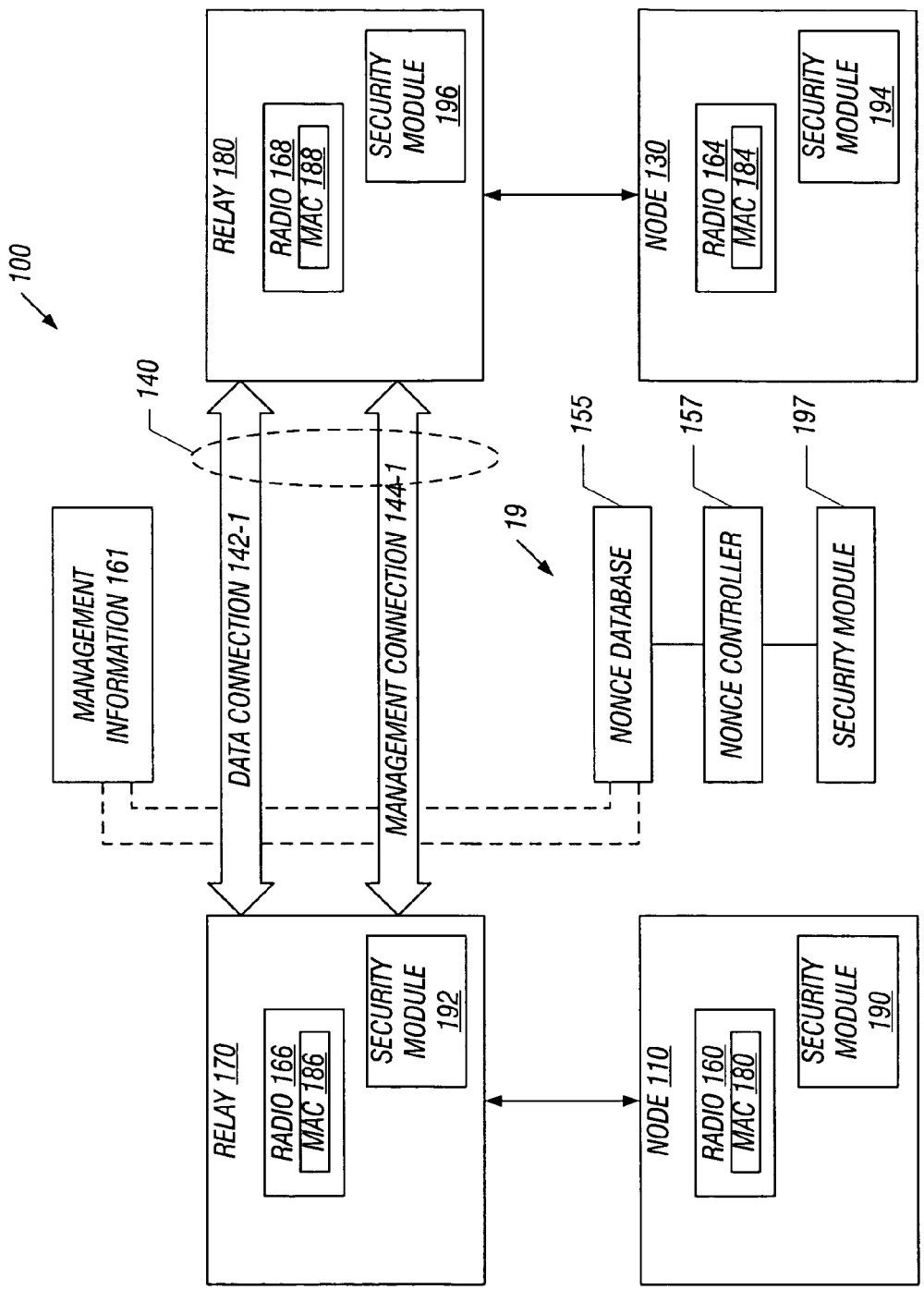
FIG. 1 illustrates one embodiment of a network.

Various embodiments are generally directed to wireless communications systems. Examples of wireless communication systems include without limitation systems compliant with various Institute of Electrical and Electronics Engineers (IEEE) standards, such as the IEEE 802.11 standards for Wireless Local Area Networks (WLANs), the IEEE 802.16 standards for Wireless Metropolitan Area Networks (WMANs), and the IEEE 802.20 or Mobile Broadband Wireless Access (MBWA), among others. For example, the Worldwide Interoperability for Microwave Access (WiMAX) is a wireless broadband technology based on the IEEE 802.16 standard of which IEEE 802.16-2004 and the 802.16e amendment (802.16e-2005) are Physical (PHY) layer specifications. Some embodiments may be implemented with reference to the IEEE 802.16 Draft Standard for Local and Metropolitan Networks titled "Part 16: Air Interface for Broadband Wireless Access Systems," P802.16Rev2/D0b (Revision of IEEE Standard 802.16-2004), as amended by IEEE Standard 802.16f-2005 and IEEE Standard 802.16e-2005), dated Jun. 27, 2007 ("WiMAX Specification"), and its progeny, revisions and variants. Some embodiments may be described and implemented with reference to the IEEE 802.16 Baseline Document for Draft Standard for Local and Metropolitan Area Networks titled "Part 16: Air Interface for Broadband Wireless Access Systems, Multihop Relay Specification," 802.16j-06/026r4, dated Jun. 6, 2007 ("IEEE 802.16 Baseline Specification"), and its progeny, revisions and variants. Although some embodiments may be described with reference to the WiMAX Specification and the IEEE 802.16 Baseline Specification by way of example and not limitation, it may be appreciated that various embodiments may be implemented for other wireless communications systems as well.

In one embodiment, an apparatus such as a node may include a radio or wireless transmitter/receiver ("transceiver") and a classifier module. The classifier module may classify management information for a wireless communications network. Examples of management information may include medium access control (MAC) management messages of varying management message types as defined by the WiMAX Specification and/or the IEEE 802.16 Baseline Specification. For example, the classifier module may classify management information as MAC security management information or MAC management information. The MAC security management information may represent any management information used for implementing or managing a given security technique for the wireless communications network, such as MAC privacy key management (PKM) information. Examples of MAC PKM messages may include without limitation a PKM request (PKM-REQ) and a PKM response (PKM-RSP) for respective management message types 9, 10. The MAC management information may represent all other forms of management information used by the wireless communications network, such as power management messages, hand-off information, frequency information, configuration information, and so forth. The wireless transceiver may couple to the classifier module, and the wireless transceiver may be operative to communicate the MAC security management information over one or more insecure management connections and the MAC management information over one or more secure management connections.

A network 100, shown in FIG. 1, may comprise multiple nodes, such as nodes 110, 130. A node generally may comprise any physical or logical entity for communicating information in the network 100 and may be implemented as hardware, software, or any combination thereof, as desired for a given set of design parameters or performance constraints. Although FIG. 1 may show a limited number of nodes by way of example, it can be appreciated that more or less nodes may be employed for a given implementation.

In various embodiments, the nodes 110, 130 may be arranged to communicate control information and media information over wireless shared media 140. In the illustrated embodiment, the node 110 may comprise a wireless transmitter node designated as a source (S) node, and the node 130 may comprise a wireless receiver node designated as a destination (D) node.

In various embodiments, the S node 110 may represent any transmitting node. In one embodiment, for example, the S node 110 may represent a network point of attachment. A network point of attachment may comprise any device capable of acting as a communication hub for wireless client devices to connect to a wired network from a wireless network. Network points of attachment may include, but are not necessarily limited to, a wireless access point (AP), a WiFi or WLAN AP (e.g., hotspots), a WiMAX wireless broadband base station, a cellular base station, a Node B, a relay station, a mobile subscriber center, a radio network controller, a router, a switch, a bridge, a gateway, and any other device capable of acting as a communication hub for wireless client devices to connect to a wired network from a wireless network and to extend the physical range of service of a wireless network. The embodiments are not limited in this context.

In one embodiment, for example, the D node 130 may represent any receiving node. In one embodiment, for example, the D node 130 may represent a wireless client device. A wireless client device may include any electronic device having wireless capabilities, including a processing system, a computer system, a computer sub-system, a computer, an appliance, a workstation, a terminal, a server, a personal computer (PC), a laptop, an ultra-laptop, a handheld computer, a personal digital assistant (PDA), a set top box (STB), a telephone, a mobile telephone, a cellular telephone, a handset, a subscriber station (SS), a relay station, a microprocessor, an integrated circuit such as an application specific integrated circuit (ASIC), a programmable logic device (PLD), a processor such as general purpose processor, a digital signal processor (DSP) and/or a network processor, and so forth.

In various embodiments, the nodes 110, 130 may include respective security modules 190, 194. The security modules 190, 194 may be arranged to implement any number of security techniques to protect information communicated between the nodes 110, 130. In one embodiment, for example, the security modules 190, 194 may be arranged to implement data encryption and decryption in accordance with the Advanced Encryption Standard (AES) in Counter with Cipher Block Chaining Message Authentication Code (CBC-MAC) (CCM) mode as defined by IEEE RFC 3610 and implemented by the WiMAX Specification and the IEEE 802.16 Baseline Specification. Other security techniques may be implemented by the security modules 190, 194 as well as desired for a given operational environment.

In various embodiments, the nodes 110, 130 may include respective wireless transceivers or radios 160, 164. As used herein, the terms "wireless transceiver" and "radio" may be synonymous or interchangeable. The radios 160, 164 may be arranged to perform physical (PHY) layer and/or MAC layer operations to communicate information over the wireless shared media 140. The radios 160, 164 may be compliant with one or more wireless communication standards, such as standards promulgated by IEEE, the Internet Engineering Task Force (IETF), the International Telecommunications Union (ITU), the Joint Technical Committee (JTC) of European Telecommunications Standards Institute (ETSI), the European Committee for Electrotechnical Standardization (CENELEC), the European Broadcasting Union (EBU), and so forth. In various embodiments, the radios 160, 164 may be compliant with one or more IEEE 802.XX standards including IEEE 802.11 standards (e.g., 802.11a, b, g, h, j, m, n, and progeny, revisions or variants), the IEEE 802.16 standards (e.g., 802.16-2004, 802.16.2-2004, 802.16e-2005, 802.16f, and progeny, revisions or variants), the IEEE 802.20 standards and progeny, revisions or variants, and so forth. In various embodiments, the radios 160, 164 may also be compliant with one or more Digital Video Broadcasting (DVB) standards including the ETSI Digital Video Broadcasting Terrestrial (DVB-T) broadcasting standards and variants, the DVB Handheld (DVB-H) broadcasting standards and variants, the Digital Multimedia Broadcasting (DMB) broadcasting standards and variants. In one embodiment, the radios 160, 164 may be compliant with the WiMAX Specification by way of example and not limitation.

In various embodiments, the radios 160, 164 may communicate information over wireless shared media 140. The wireless shared media 140 may comprise one or more allocations of RF spectrum. The allocations of RF spectrum may be contiguous or non-contiguous. The radios 160, 164 may implement various types of PHY layer functionality to communicate information over the wireless shared media 140 using various multicarrier techniques utilized by, for example, WiMAX or WiFi systems. The radios 160, 164 may include various communications elements used to support wireless communications, such as the respective MAC controllers or processors 180, 184. The MAC processors 180, 184 may implement various types of MAC layer functionality for the respective nodes 110, 130.

In various embodiments, the radios 160, 164 may establish various communications channels or connections between the nodes 110, 130. In some embodiments, the radios 160, 164 may establish various types of communications connections, including management channels or connections to communicate management information, and transport channels or connections to communicate media information. Management information may refer to any data representing commands, instructions or control words meant to control or manage an automated system. For example, management information may be used to establish communications connections, route media information through a system, or instruct a node to process the media information in a predetermined manner. In one embodiment, for example, the management information may include the full range of media access control (MAC) messaging, signaling plane messaging, control plane messaging, and so forth. With respect to MAC messaging, the management information may refer to the various types of management messages defined by the WiMAX Specification and the IEEE 802.16 Baseline Specification. Media information generally may refer to any data representing content meant for a user, such as user data, image information, video information, graphical information, audio information, voice information, textual information, numerical information, alphanumeric symbols, character symbols, and so forth.

In various embodiments, the connections may include one or more management connections 144-1-*m*, where m may represent any positive integer and one or more data connections 142-1-*m*, where m may represent any positive integer.

In some embodiments, the connections 142-1-*m* and 144-1-*m* may comprise or be implemented in accordance with the WiMAX specification and 802.16 Baseline Specification.

In some embodiments, nodes, such as the nodes 110 and 130, may communicate with a base station through relays, such as the relays 170 and 180. Thus, in some embodiments, the nodes 110 and 130 may be subscriber stations in accordance with the 802.16j specification, for example. The relays 170 and 180 essentially expand the reach of a fixed base station by wirelessly forwarding communications with subscriber stations within the territory of a base station. The components of the relays 170 and 180 may generally correspond to the components of the nodes 110 and 130. In other words, the radios 166 and 168 of the relays may correspond to the radios 160 and 164 of the nodes, the relays' MACs 186 and 188 may correspond to the MACs in the nodes and the relays' security modules and 192 and 196 may correspond to the security modules in the nodes. Any number of relays (or no relays at all) may be used in various embodiments.

The relays 170 and 180 may differ from other nodes 110 and 130 because the relays may handle nonce assignments in some embodiments of the present invention. Issues may arise, in some embodiments, with respect to nonce assignments because relays within the same base station's territory, for example, may not know which parts of the nonce space are being used by other relays. If nonces were exclusively handled by the base station, awareness of which nonces were being used could become confused between the different relays. Because of their size, nonces may be cumbersome to exchange. A nonce may be of a relatively large size because each time a new encryption is done, a new nonce value is needed.

In some embodiments, nonce processing may be handled by relays 170 and 180, as well as by the base station 19 which may include a nonce controller 157, a nonce database 155, and a security module 197. The nonce database includes the entire set of nonces available to all nonce consumers within the territory of the base station 19, in one embodiment. The nonces may be distributed under the control of controller 157. However, in other embodiments, the nonce assignment done by the relays in FIG. 1 may be done by the nodes 110 and 130.

Figure 2:
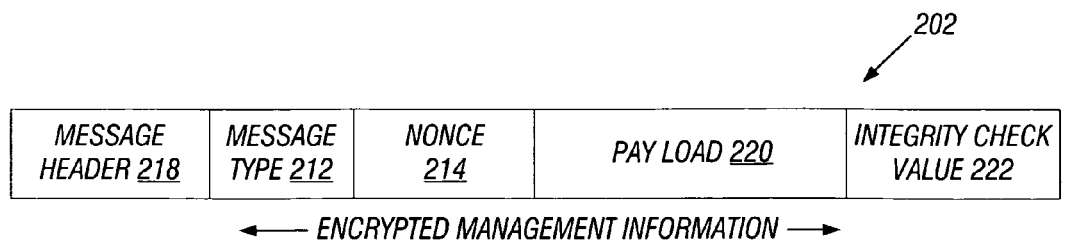
FIG. 2 illustrates one embodiment of a first management packet.

An example of possible packet formats for packets implemented and suitable for communications over connections 142-1-m and 144-1-m may be described with reference to FIG. 2. A packet 202 may represent an example of a message type to encapsulate a protected MAC protocol data unit MPDU) or a MAC Management Protocol Data Unit (MMPDU) after encryption by the security modules 190, 194. As shown in FIG. 2, the packet 202 may have a packet format with various defined fields designed to carry or communicate corresponding parameters. For example, the packet 202 may include a message header 218, a message type 212, a nonce 214, a payload 220, and an integrity check value (ICV) 222. The message type 212 may comprise a message type value used to identify the packet 202 as management or data and as a secured packet. The nonce 214, which is described in greater detail hereinafter, may comprise a number or bit string that is used only once. The message type 216 may comprise a message type as defined by the WiMAX Specification or the IEEE 802.16 Baseline Specification. The message header 218 may comprise a message specific header for a given message type 212. The payload 220 may comprise the protected packet data or protected management data being communicated. The ICV 222 may comprise a checksum or message footprint that allows an information technology system to detect changes or errors in data, thus ensuring data integrity. One-way hash functions are used to calculate the ICV 222 as part of the error-checking process. Suitable hash functions include 128-bit Message Digest 5 (MD5), 160-bit Secure Hash Algorithm (SHA-1) or the CBS-MAC algorithm. The ICV 222 may be computed with a Hash Message Authentication Code (HMAC) algorithms. In this case, the size of the HMAC output is typically the same as that of the underlying hash function (e.g., 128 or 160 bits in the case of MD5 and SHA-1), although it can be truncated if desired. For the packet 202, the message type 212, message header 218 and the payload and ICV 220 may be protected by the security modules 190, 194 to form encrypted information.

Figure 3:
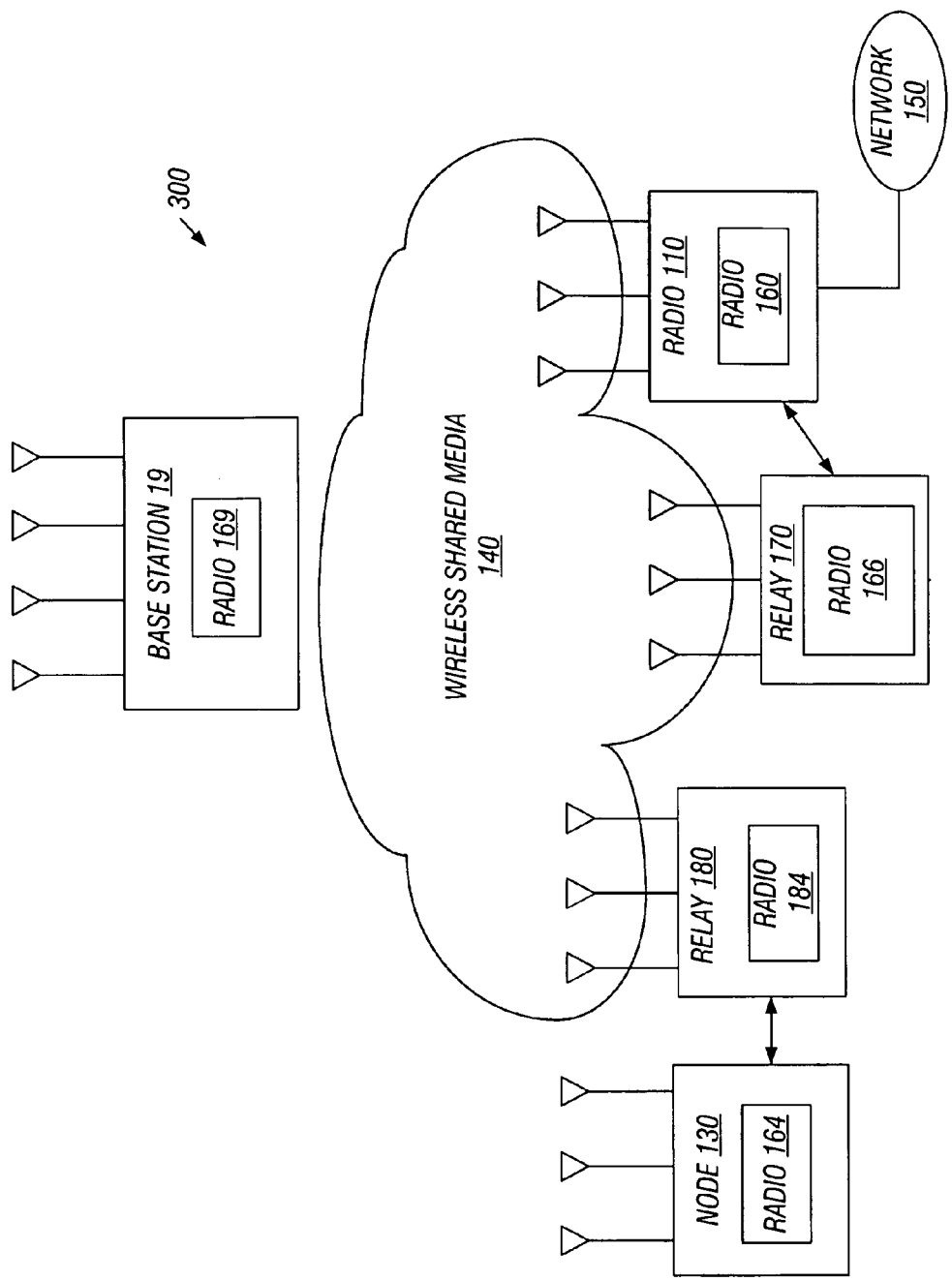
FIG. 3 illustrates one embodiment of a communications system.

FIG. 3 illustrates one embodiment of a communications system 300 implementation of the network 100. System 300 may comprise, for example, a communications system having multiple nodes, including nodes 110, 130.

Embodiments of system 300 may include one or more fixed, stationary or mobile client devices and network points of attachment, such as the nodes 110, 130 described with reference to FIG. 1. In one embodiment, for example, the nodes 110, 130 may comprise respective radios 160, 164, as described with reference to FIG. 1.

In one embodiment, system 300 nodes 110, 130 may comprise fixed wireless devices. A fixed wireless device may comprise a generalized equipment set providing connectivity, management, and control of another device, such as a mobile client device. Examples for nodes 110, 130 with fixed wireless devices may include a wireless AP, base station or node B, router, switch, hub, gateway, and so forth. In other embodiments, for example, nodes 110, 130 may comprise WiFi WLAN AP, WiMAX broadband wireless base stations, among other technology APs and/or base stations for WLAN, WMAN, wireless personal area network (WPAN), wireless wide area network (WWAN), cellular, and others, for example. Although some embodiments may be described with nodes 110, 130 implemented as a WiFi WLAN access point or WiMAX wireless broadband base station by way of example, it may be appreciated that other embodiments may be implemented using other wireless devices and technologies as well. The embodiments are not limited in this context.

The base station 19 may be a fixed, immobile entity which is hard wired to a communications system. It may communicate wirelessly with relays 180 and 170 which extend its range. For example, the relay 180 may extend the range of the base station 19 to the node 130 and the relay 170 may extend the range of the base station 19 to the node 110.

Figure 4:
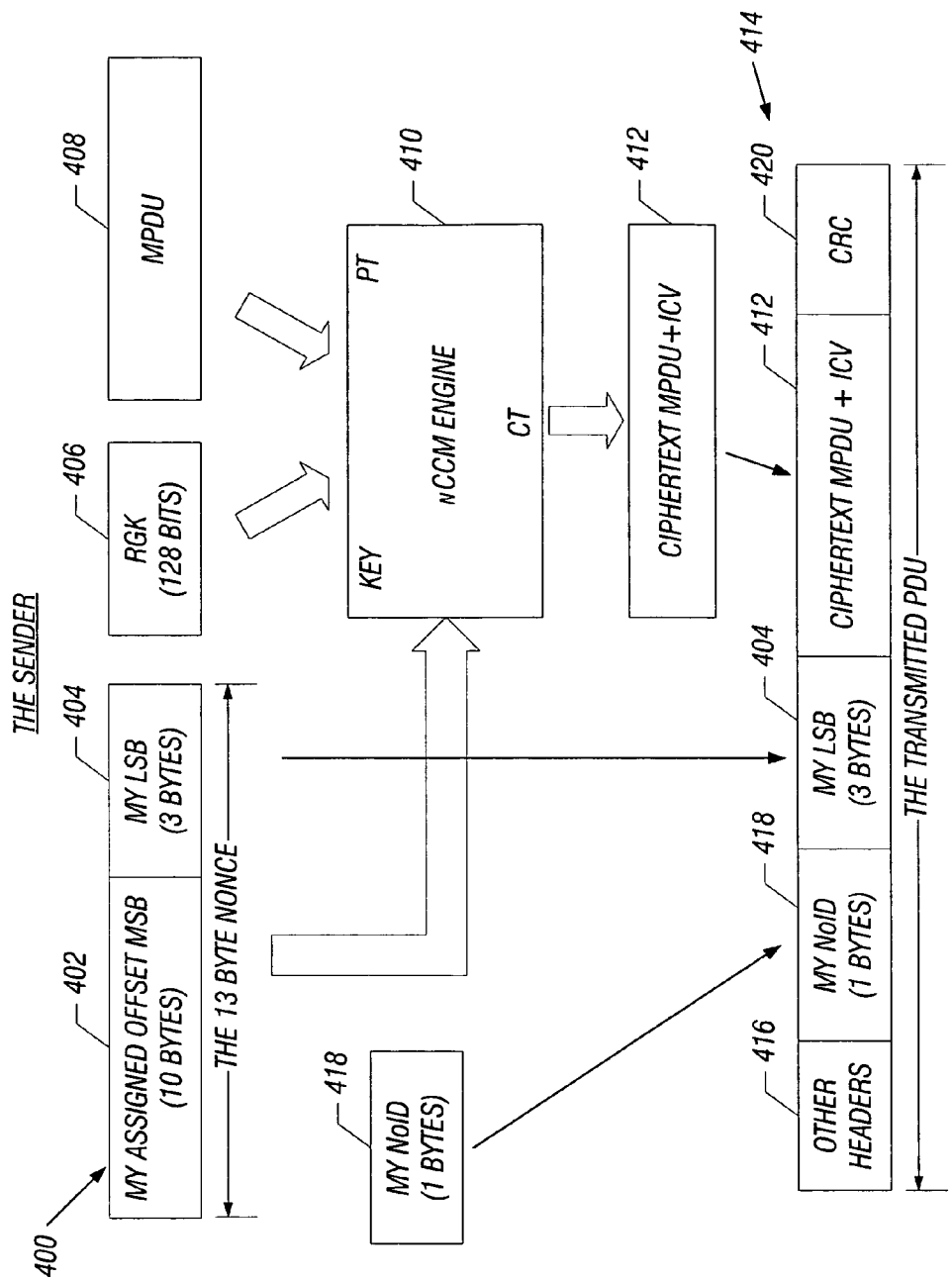
FIG. 4 is a flow chart of a transmission by a sender.

Initially, a nonce 400 may be developed that is made up of most significant bits 402 and least significant bits 404, as indicated in FIG. 4, showing the transmission of a packet data unit by a node. The nonce may be assembled by a security module, in one embodiment, which may include a controller, which implements the sequence of FIG. 4, in hardware, firmware, or software. A relay group key may be shared by all relays within a group, associated with one base station as long as nonces are never reused with that key. In one embodiment, the nonce may be 13 bytes, the least significant bits are 3 bytes and the most significant bits are 10 bytes, but other sizes of nonces may be used. The larger the nonce, the more troublesome it is to communicate, but the less likely the communication system is to run out of available nonces. The 12-byte nonce may be combined with the relay group key (RGK) 406, which in one embodiment may be 128 bits, and the MPDU 408. A CCM engine 410 may process the RGK 406, the MPDU 408, and the nonce 400 to come up with a ciphertext MPDU+ICV 412. The item 412 may then be identified for use in a transmitted packet data unit 414. The packet data unit 414 may include headers 416, a NOID 418, the least significant bits 404, and the ciphertext MPDU and ICV 412.

The NOID 418 is a nonce offset identifier which, in one embodiment, may be one byte. It is essentially the address of a block of a plurality of nonces available for use by a particular entity, for example, one of the relays. The base station, in one embodiment, may forward a block of a plurality of nonces to each relay. A block may be identified by a NOID 418 which identifies, in a shorthand way, the most significant bits of the nonce. Thus, the NOID, which may be only one byte, saves sending all of the most significant bit information in one embodiment.

In some embodiments, the transmitted packet data unit may include the least significant bits of a nonce (which is only three bytes in one embodiment) and the NOID 418 for the most significant bits (which is 10 bytes in one embodiment).

In other embodiments, the mix between the number of most significant and least significant bits may be adjusted. For example, in one embodiment, the most significant bits may be equal to the number of least significant bits. In some embodiments, the number of most significant bits may be more than the number of least significant bits and vice versa.

Figure 5:
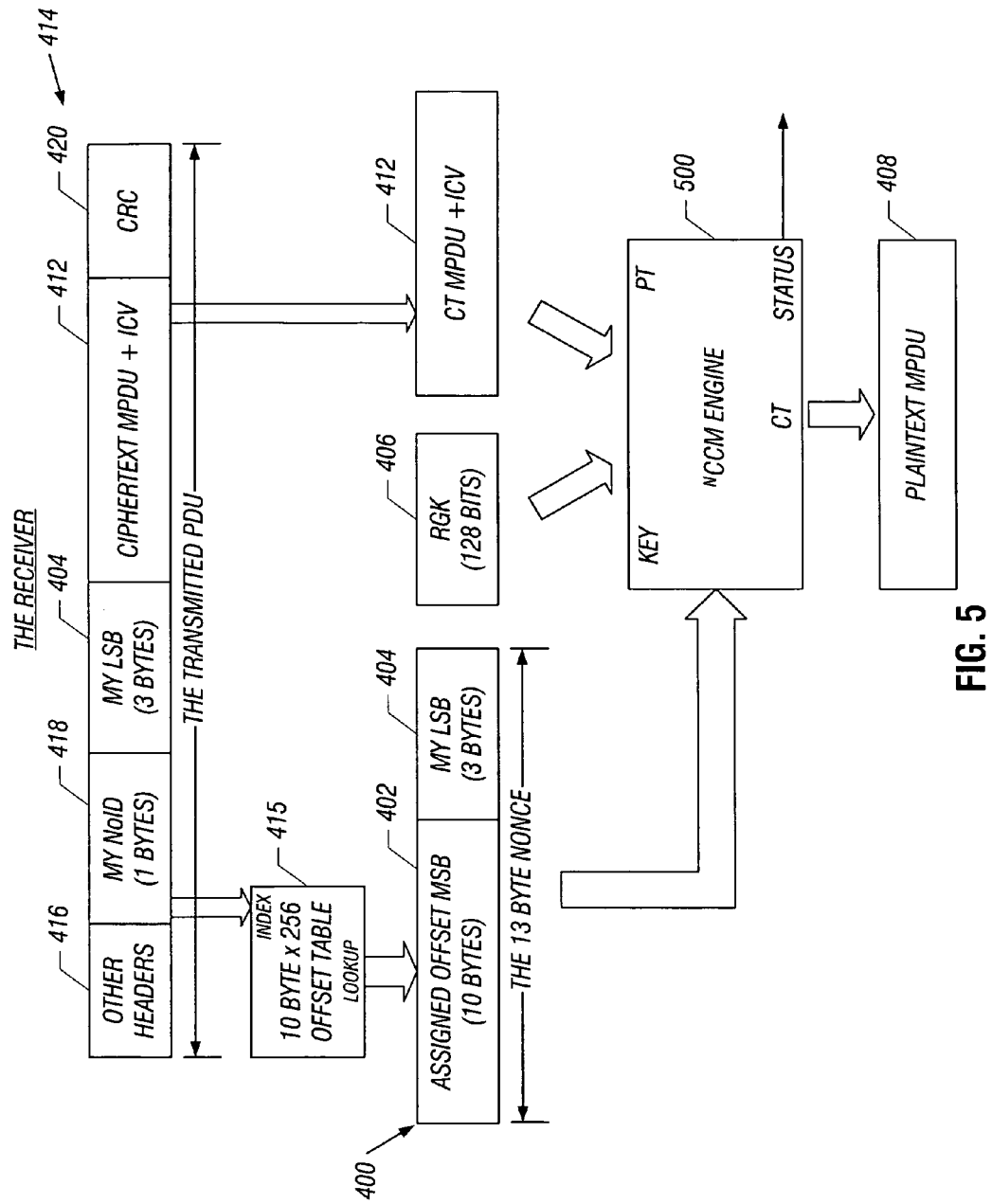
FIG. 5 is a flow chart of a receipt of a transmission by a receiver.

Referring to FIG. 5, the receiver node of the packet data unit 414 initially converts the NOID 418 into the most significant bits 402 by looking up the NOID in a table that identifies all of the nonces in a given block assigned to a given receiver (i.e. a relay), both linking the actual nonce most significant bits and their corresponding NOIDs. The conversion of the NOID into the most significant bits may be under control of the security module within the receiver node, which controller may implement the sequence of FIG. 5, in one embodiment, in hardware, software, or firmware. Thus, the NOID points to its most significant bits of the nonce in the table, as indicated at block 415. Then, the full nonce can be reconstructed by combining the corresponding most significant bits 402 with the least significant bits 404 (already provided in the packet data unit). The CCM engine 500 then produces a ciphertext MPDU 412 and ICV using the nonce 400, the RGK 406, and the MPDU 408. A transmitted packet data unit 414 then includes headers 416, a NOID 418, least significant bits 404, ciphertext MPDU and ICV 412, and may include a cyclic recovery check data 420.

Figure 6:
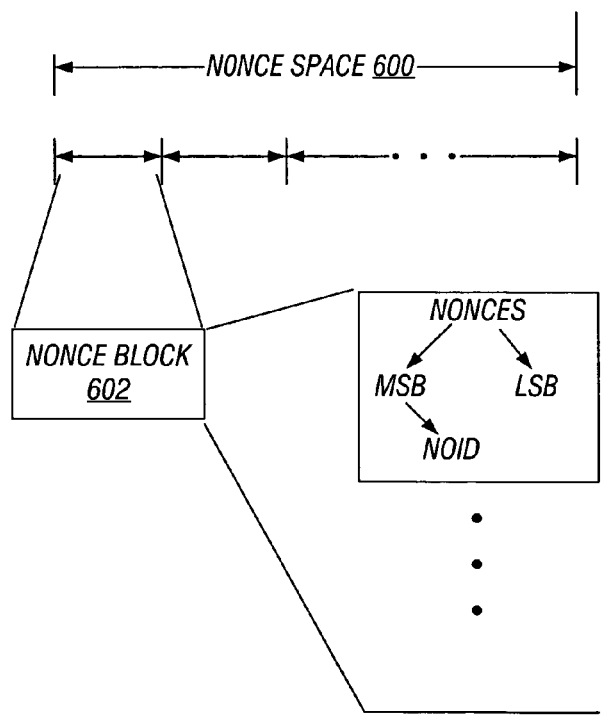
FIG. 6 is a schematic depiction of a nonce library.

Referring to FIG. 6, a nonce space 600 may consist of a given size of memory in database 155 (FIG. 1) devoted to representing all of the available nonces for all the nonce consuming entities. In one embodiment, the nonce library of all the nonces is stored only in the base station 19. In one embodiment, the nonce space may be $2^{104}$ bits. The nonce space may be divided into blocks 602 of smaller size. Each block may be assigned to an entity (e.g., a relay) that needs to utilize nonces. The nonce block 602 includes a plurality of nonces which may be of a size of $2^{24}$ bits in one example. Each nonce within the block may be identified by an offset value. The nonces consist of a most significant bits (which may be identified by a NOID) and the least significant bits.

Figure 7:
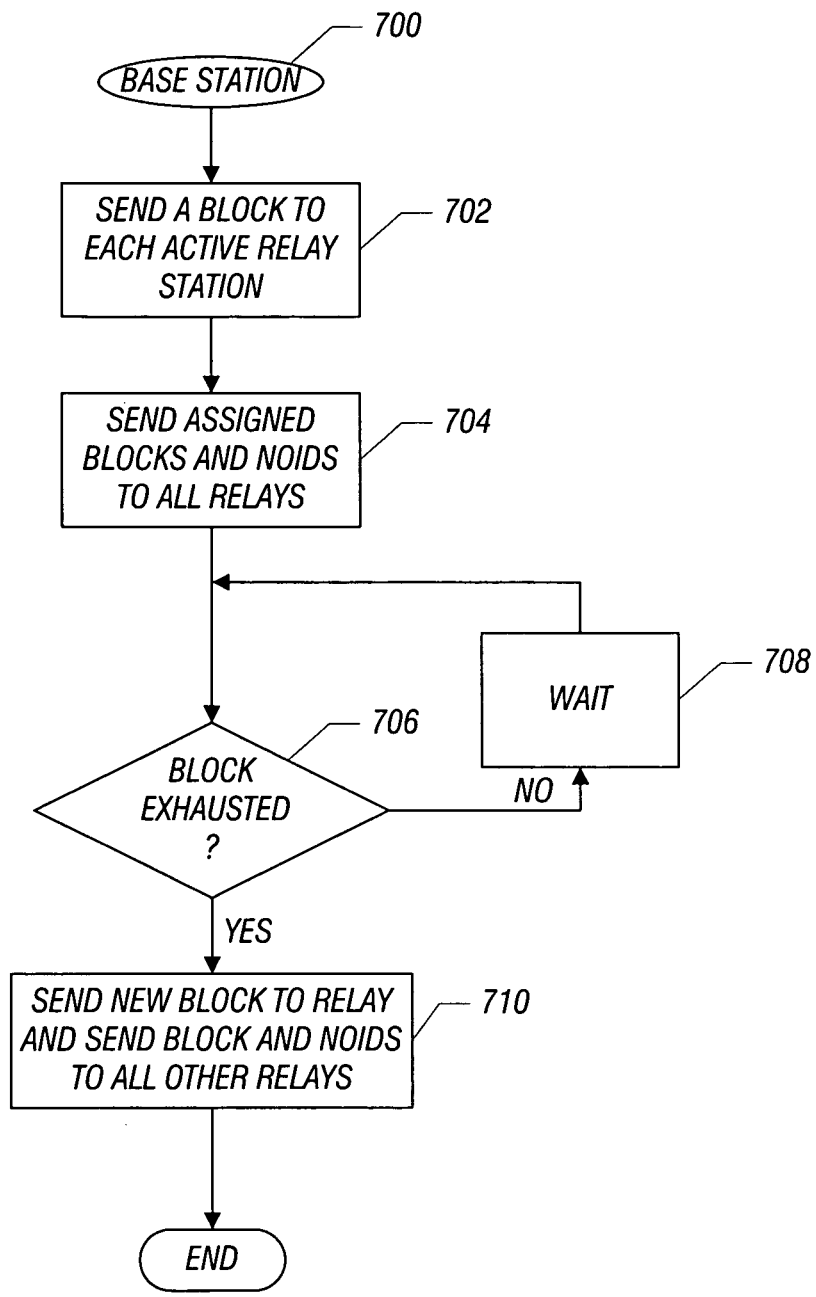
FIG. 7 is a flow chart for nonce assignment.

Referring to FIG. 7, the base station, in one embodiment, may be responsible for handling the assignment of nonces. Initially, the base station may provide each active nonce consumer (e.g., a relay) with a block of nonces. In some embodiments, no more than 256 active devices are expected within any base station's territory. Thus, each active device, such as a relay station, may be sent a block of nonces as indicated in block 702. In addition, the assigned blocks and NOIDs are sent to all the relays, as indicated in block 704. In other words, every relay has all of the NOIDs and the block assignments for every other relay within the territory. On each packet transmission, only the least significant bits increment in one embodiment.

A check at diamond 706 determines whether the base station has received a report from a relay or other user of a block of nonces that it is about to use up all of its available nonces. If not, the flow simply waits, as indicated in block 708. If there is a request for additional nonces, a new block of nonces may be sent to the relay or other nonce user, as indicated in block 710. In addition, the block and the NOIDs assigned to the relay are also sent to all the other relays. This is so all the other relays can identify the nonce most significant bits when they receive a packet data unit that only includes a NOID and least significant bits. Through the NOID, any relay can identify the most significant bits, which then may be combined with the least significant bits included with the packet data unit to reconstruct the nonce.

Thus, some embodiments may solve one or more problems that arise from nonce assignment. If the nonce is a small number of bits the key must be replaced frequently and such key replacement is relatively expensive in terms of use of system resources. If a much larger nonce is used, there is a significant overhead introduced by the need to transmit the large nonce value with each packet. In addition, when a particular key is shared among multiple transmitting devices, such as relays, the devices need a mechanism to ensure that not only does no single device ever use the same nonce value twice, but no device uses a nonce value previously used by another device within the context of the same key. Some embodiments of the present invention may handle one or more of these issues.

In some cases, various embodiments may be implemented as an article of manufacture. The article of manufacture may include a computer-readable medium or storage medium arranged to store logic and/or data for performing various operations of one or more embodiments. Examples of computer-readable media or storage media may include, without limitation, those examples as previously described. In various embodiments, for example, the article of manufacture may comprise a magnetic disk, optical disk, flash memory or firmware containing computer program instructions suitable for execution by a general purpose processor or application specific processor. The embodiments, however, are not limited in this context.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   transmitting a packet data unit including a header and packet data;
   providing a plurality of nonce blocks, each block including a nonce and being associated with an identifier;
   inserting, using a hardware processor, in said header, a plurality of least significant bits of a nonce and an identifier to locate a block including the most significant bits of that nonce;
   cryptographically protecting information in the packet data unit with an encryption key associated with the most significant bits of the nonce; and
   decrypting the protected information in the packet only if the most significant bit of the nonce is known.

2. The method of claim 1 including reserving a nonce space including a plurality of blocks and providing a block of a plurality of nonces to a nonce consumer.

3. The method of claim 2 including providing a new block of nonces in response to a request from said consumer for additional nonces.

4. The method of claim 3 including distributing the identifier and the portion of the nonce identified by said identifier to a plurality of nonce users.

5. The method of claim 1 wherein transmitting the packet data unit including transmitting a header and packet data from a relay to a node and receiving from a base station, a block of nonces together with nonce identifiers from said base station.

6. The method of claim 1 wherein said identifier indicates a block of nonces.

7. An apparatus comprising:
 a radio;
 a security module coupled to said radio; and
 said security module including a controller to transmit a packet data unit including a header and packet data, to insert, in said header, a plurality of least significant bits of a nonce and an identifier to locate the most significant bits of that nonce and to cryptographically protect information in the packet data unit with an encryption key associated with the most significant bits of the nonce, said controller to decrypt the protected information in the packet only if the most significant bits of the nonce is known.

8. The apparatus of claim 7 wherein said apparatus is a node.

9. The apparatus of claim 8 wherein said node is a relay.

10. The apparatus of claim 7 wherein said apparatus is a base station.

11. The apparatus of claim 7, said controller to insert said identifier to identify the most significant bits of said nonce.

12. The apparatus of claim 7, said controller to reserve nonce space including a plurality of blocks and provide a block of a plurality of nonces to a nonce consumer.

13. The apparatus of claim 12, said controller to provide a new block of nonces in response to a request from said consumer for additional nonces.

14. The apparatus of claim 13, said controller to distribute the identifier and the portion of the nonce identified by said identifier to a plurality of nonce users.

* * * * *